United States Patent
Idesawa et al.

(10) Patent No.: US 12,547,936 B2
(45) Date of Patent: Feb. 10, 2026

(54) MACHINE LEARNING PROCESSING APPARATUS, METHOD, AND PROGRAM

(71) Applicant: AISing Ltd., Tokyo (JP)

(72) Inventors: Junichi Idesawa, Tokyo (JP); Shimon Sugawara, Tokyo (JP)

(73) Assignee: AISing Ltd., Tokyo (JP)

( * ) Notice: Subject to any disclaimer, the term of this patent is extended or adjusted under 35 U.S.C. 154(b) by 774 days.

(21) Appl. No.: 17/873,321

(22) Filed: Jul. 26, 2022

(65) Prior Publication Data

US 2022/0358413 A1    Nov. 10, 2022

Related U.S. Application Data

(63) Continuation of application No. PCT/JP2020/042292, filed on Nov. 12, 2020.

(30) Foreign Application Priority Data

Feb. 10, 2020   (JP) ................................ 2020-020833

(51) Int. Cl.
*G06N 20/00*   (2019.01)

(52) U.S. Cl.
CPC .................... *G06N 20/00* (2019.01)

(58) Field of Classification Search
None
See application file for complete search history.

(56) References Cited

U.S. PATENT DOCUMENTS 5,414,849 A  *  5/1995  Yamamoto ............ G06F 9/5066
                                                    717/149
8,755,611 B2    6/2014  Tate et al.
                       (Continued)

FOREIGN PATENT DOCUMENTS

JP      H06-4292 A      1/1994
JP      2012-63959 A    3/2012
                 (Continued)

OTHER PUBLICATIONS

Hoare, "How is Splitting Decided for Decision Trees?," May 30, 2019, https://web.archive.org/web/20190530152116/https://www.displayr.com/how-is-splitting-decided-for-decision-trees/.*

(Continued)

*Primary Examiner* — Ryan Barrett
(74) *Attorney, Agent, or Firm* — Myers Wolin, LLC

(57) ABSTRACT

An information processing apparatus includes a candidate generator configured to generate a plurality of data division criterion candidates by generating data division criterion candidates on the basis of a plurality of data pieces arbitrarily selected from the data pieces to be divided at nodes that constitute the tree structure and hold the data pieces to be divided, data division processor circuitry configured to divide the data pieces to be divided on the basis of the plurality of data division criterion candidates to generate a plurality of data division results, evaluation processor circuitry configured to evaluate the data division results to respectively generate evaluation results, and division criterion determination processor circuitry configured to determine one data division criterion candidate among the plurality of data division criterion candidates as a data division criterion on the basis of the evaluation results.

9 Claims, 10 Drawing Sheets

(a) CASE OF UNIFORM DISTRIBUTION (b) CASE OF DISTRIBUTION WITH LEFT AND RIGHT BIAS (c) CASE OF DISTRIBUTION WITH TWO PEAKS

(56) References Cited

U.S. PATENT DOCUMENTS

| | | | |
|---|---|---|---|
| 10,417,575 B2 | 9/2019 | Nowozin et al. | |
| 2006/0269144 A1* | 11/2006 | Kubota | G06F 18/232 |
| | | | 382/225 |
| 2009/0222389 A1* | 9/2009 | Hido | G06N 20/10 |
| | | | 706/46 |
| 2010/0114654 A1* | 5/2010 | Lukose | G06Q 30/00 |
| | | | 705/14.54 |
| 2015/0125072 A1* | 5/2015 | Mitarai | G06V 10/70 |
| | | | 382/155 |
| 2016/0125273 A1 | 5/2016 | Matsunaga | |
| 2017/0061327 A1* | 3/2017 | Dong | G06N 5/025 |
| 2017/0083920 A1* | 3/2017 | Zoldi | G06N 20/00 |
| 2018/0032870 A1* | 2/2018 | Liu | G06N 20/20 |
| 2018/0204126 A1* | 7/2018 | Gallé | G06Q 40/03 |
| 2021/0012214 A1* | 1/2021 | Nakanoya | G06N 5/01 |
| 2021/0125101 A1 | 4/2021 | Idesawa et al. | |
| 2022/0237524 A1* | 7/2022 | Kawabe | G06N 3/09 |
| 2024/0013030 A1* | 1/2024 | Yamazaki | G06N 3/088 |

FOREIGN PATENT DOCUMENTS

| | | |
|---|---|---|
| JP | 2016-91166 A | 5/2016 |
| JP | 2017-10436 A | 1/2017 |
| WO | 2020/008919 A1 | 1/2020 |

OTHER PUBLICATIONS

International Search Report issued by the Japan Patent Office for corresponding International Patent Application No. PCT/JP2020/042292, mailed on Feb. 2, 2021, with an English translation.

Ishwaran, Hemant, "The effect of splitting on random forests", https://link.Springer.com/article/10.1007/s10994-014-5451-2, Mach Learn (2015) 99:75-118, Springer Nature.

Extended European Search Report with the Supplementary European Search Report and the European Search Opinion issued by the European Patent Office for corresponding European Patent Application No. 20918154.4, mailed on Mar. 5, 2024.

* cited by examiner

FIG. 8

| | (A) RANDOM (random) | (B) NORMALIZED (uniform) | (C) HISTOGRAM (histogram) | (D) PROPOSED METHOD |
|---|---|---|---|---|
| (1) SPEED OF DIVISION CRITERION DETERMINATION (CALCULATION LOAD) | HIGH | LOW | LOW | HIGH |
| (2) WHETHER OR NOT DATA DISTRIBUTION IS TAKEN INTO ACCOUNT | TAKEN INTO ACCOUNT | NOT TAKEN INTO ACCOUNT | TAKEN INTO ACCOUNT | TAKEN INTO ACCOUNT |
| (3) POSSIBILITY OF SELECTION OF DATA PIECES OTHER THAN DATA POINTS | NOT POSSIBLE | POSSIBLE | NOT POSSIBLE | POSSIBLE |

MACHINE LEARNING PROCESSING APPARATUS, METHOD, AND PROGRAM

CROSS-REFERENCE TO RELATED APPLICATION

This application is a continuation application of International Application No. PCT/JP2020/042292, filed on Nov. 12, 2020, and which designated the U.S., which claims priority to Japanese Patent Application No. 2020-020833, filed on Feb. 10, 2020. The contents of each are wholly incorporated herein by reference.

TECHNICAL FIELD

The present disclosure relates to an information processing apparatus, and the like, that perform machine learning, and more particularly, to an information processing apparatus, and the like, that perform machine learning by utilizing a tree structure.

BACKGROUND

In recent years, a machine learning technique utilizing a tree structure such as a decision tree and a random forest has increasingly attracted attention.

In this type of machine learning technique, a learned tree structure is formed by dividing data pieces to be learned on the basis of a predetermined algorithm. In other words, the tree structure has been formed by dividing the data pieces to be learned with a plurality of division criteria in accordance with a predetermined division criterion determination method and selecting a division criterion that satisfies a predetermined condition, for example, a condition that makes an information gain maximum among the plurality of division criteria.

FIG. 10 is an explanatory diagram regarding a method for determining a division criterion for data pieces to be learned in a decision tree in related art. (a) of FIG. 10 illustrates a manner in which exhaustive search is performed using midpoints between respective data pieces in the data pieces to be learned as division criterion candidates, and (b) of FIG. 10 illustrates a manner in which exhaustive search is performed using every other data piece to be learned as the division criterion candidates.

In the example in (a) of FIG. 10, the data pieces are divided using the midpoints between the respective data pieces as the division criterion candidates, results of the division are respectively evaluated, and a division criterion candidate that ultimately provides the most favorable evaluation result is determined as a division criterion. On the other hand, in the example in (b) of FIG. 10, the data pieces are divided using every other data piece as the division criterion candidates, results of the division are respectively evaluated, and a division criterion candidate that ultimately provides the most favorable evaluation result is determined as the division criterion.

In this way, in the decision tree in related art, division has been exhaustively performed a plurality of times using a predetermined manner to determine an optimal division criterion.

On the other hand, division criteria of individual tree structures have been determined using various manners also in an ensemble learning manner that utilizes a number of tree structures. For example, in a random forest which is one of the ensemble learning manners, there is a case where a manner is used in which division is experimentally performed a plurality of times on the basis of one data piece arbitrarily (randomly) selected from data pieces to be divided, results of the division are respectively evaluated, and a division criterion candidate that ultimately provides the most favorable evaluation result is determined as a division criterion (for example, Non Patent Literature 1).

Further, there is a case where a manner is used in which all data pieces to be divided are read out and normalized while maximum and minimum data pieces are specified, and a division criterion is determined on the basis of the normalized data pieces. Still further, there is a case where a manner is used in which a histogram of data pieces to be divided is created, and a representative value of the histogram is determined as the division criterion.

CITATION LIST

Non Patent Literature

Non Patent Literature 1: Hemant Ishwaran, "The Effect of Splitting on Random Forests", [online], released on Jul. 2, 2014, Accessed Jan. 20, 2020, Retrieved from: https://link.springer.com/article/10.1007/s10994-014-5451-2

SUMMARY

Technical Problem

However, among division criterion determination algorithms for generating a tree structure, in an algorithm of exhaustively searching for a division criterion with reference to data pieces to be divided (for example, FIG. 10), an algorithm in which normalization is performed, an algorithm in which a histogram is created, and the like, it is necessary to refer to all or at least most part of the data pieces to be divided. This requires time to determine a division criterion due to processing load in association with the reference, which may lead to degradation of learning speed.

In a manner in which division is performed on the basis of one data piece arbitrarily (randomly) selected from the data pieces to be divided, it is not necessary to refer to all data pieces, and thus, learning load is small. However, the division largely depends on the selected data piece, which may lead to inappropriate division with a small information gain, or the like. Further, in a case where the number of data pieces to be learned is small, there is a possibility that the division criterion candidates may be less diversified.

The present disclosure has been made against the technical background described above, and an object of the present disclosure is to rapidly and appropriately determine a division criterion for dividing data pieces to be learned in generation of a tree structure to be utilized in machine learning.

Further other objects and operational effects of the present disclosure will be easily understood by a person skilled in the art by referring to the following description of the specification.

Solution to Problem

The technical problem described above can be solved by an information processing apparatus, a method, a program, a system, or the like, having the following configurations.

In other words, an information processing apparatus according to the present disclosure is an information processing apparatus for generating a tree structure to be utilized in machine learning on the basis of data pieces to be divided, the information processing apparatus including a candidate generation unit configured to generate a plurality of data division criterion candidates by generating data division criterion candidates on the basis of a plurality of data pieces arbitrarily selected from the data pieces to be divided at nodes that constitute the tree structure and hold the data pieces to be divided, a data division unit configured to divide the data pieces to be divided on the basis of the plurality of data division criterion candidates to generate a plurality of data division results, an evaluation unit configured to evaluate the data division results to respectively generate evaluation results, and a division criterion determination unit configured to determine one data division criterion candidate among the plurality of data division criterion candidates as a data division criterion on the basis of the evaluation results.

According to such a configuration, data pieces are divided by generating division criterion candidates from a plurality of data pieces arbitrary selected from the data pieces to be divided, so that it is not necessary to refer to values for all of the data pieces to be divided, which makes calculation load small, and it is possible to divide the data pieces at an appropriate position because of low dependency on the selected data pieces. In other words, it is possible to rapidly and appropriately determine a division criterion for appropriately dividing data pieces to be learned in generation of a tree structure to be utilized in machine learning.

The data division criterion candidates may be average values of the plurality of data pieces arbitrarily selected from the data pieces to be divided.

The data division criterion candidates may be arbitrary values between a minimum value and a maximum value of the plurality of data pieces arbitrarily selected from the data pieces to be divided.

The information processing apparatus may further include a switching unit configured to generate a switch signal for switching a generation algorithm of the data division criterion candidates in a case where the number of the data pieces to be divided is equal to or larger than a predetermined number.

A manner of the machine learning may be a decision tree.

A manner of the machine learning may be ensemble learning utilizing a plurality of tree structures.

A manner of the ensemble learning may be one or a combination of bagging and boosting utilizing tree structures.

A manner of the ensemble learning may be a random forest.

Further, the present disclosure viewed from another aspect is an information processing method for generating a tree structure to be utilized in machine learning on the basis of data pieces to be divided, the information processing manner including a candidate generation step of generating a plurality of data division criterion candidates by generating data division criterion candidates on the basis of a plurality of data pieces arbitrarily selected from the data pieces to be divided at nodes that constitute the tree structure and hold the data pieces to be divided, a data division step of dividing the data pieces to be divided on the basis of the plurality of data division criterion candidates to generate a plurality of data division results, an evaluation step of evaluating the data division results to respectively generate evaluation results, and a division criterion determination step of determining one data division criterion candidate among the plurality of data division criterion candidates as a data division criterion on the basis of the evaluation results.

Further, the present disclosure viewed from still another aspect is an information processing program for generating a tree structure to be utilized in machine learning on the basis of data pieces to be divided, the information processing program including a candidate generation step of generating a plurality of data division criterion candidates by generating data division criterion candidates on the basis of a plurality of data pieces arbitrarily selected from the data pieces to be divided at nodes that constitute the tree structure and hold the data pieces to be divided, a data division step of dividing the data pieces to be divided on the basis of the plurality of data division criterion candidates to generate a plurality of data division results, an evaluation step of evaluating the data division results to respectively generate evaluation results, and a division criterion determination step of determining one data division criterion candidate among the plurality of data division criterion candidates as a data division criterion on the basis of the evaluation results.

The present disclosure viewed from yet another aspect is an information processing system for generating a tree structure to be utilized in machine learning on the basis of data pieces to be divided, the information processing system including a candidate generation unit configured to generate a plurality of data division criterion candidates by generating data division criterion candidates on the basis of a plurality of data pieces arbitrarily selected from the data pieces to be divided at nodes that constitute the tree structure and hold the data pieces to be divided, a data division unit configured to divide the data pieces to be divided on the basis of the plurality of data division criterion candidates to generate a plurality of data division results, an evaluation unit configured to evaluate the data division results to respectively generate evaluation results, and a division criterion determination unit configured to determine one data division criterion candidate among the plurality of data division criterion candidates as a data division criterion on the basis of the evaluation results.

Advantageous Effect

According to the present disclosure, it is possible to rapidly and appropriately determine a division criterion for dividing data pieces to be learned in generation of a tree structure to be utilized in machine learning.

BRIEF DESCRIPTION OF DRAWINGS

FIG. 8 is a comparison table between a division manner according to the present embodiment and other division manners.

DESCRIPTION OF EMBODIMENTS

One embodiment of the present disclosure will be described in detail below with reference to the accompanying drawings.

1. First Embodiment (1.1 Configuration)

A hardware configuration of the present embodiment will be described with reference to FIG. 1 to FIG. 3.

Figure 1:
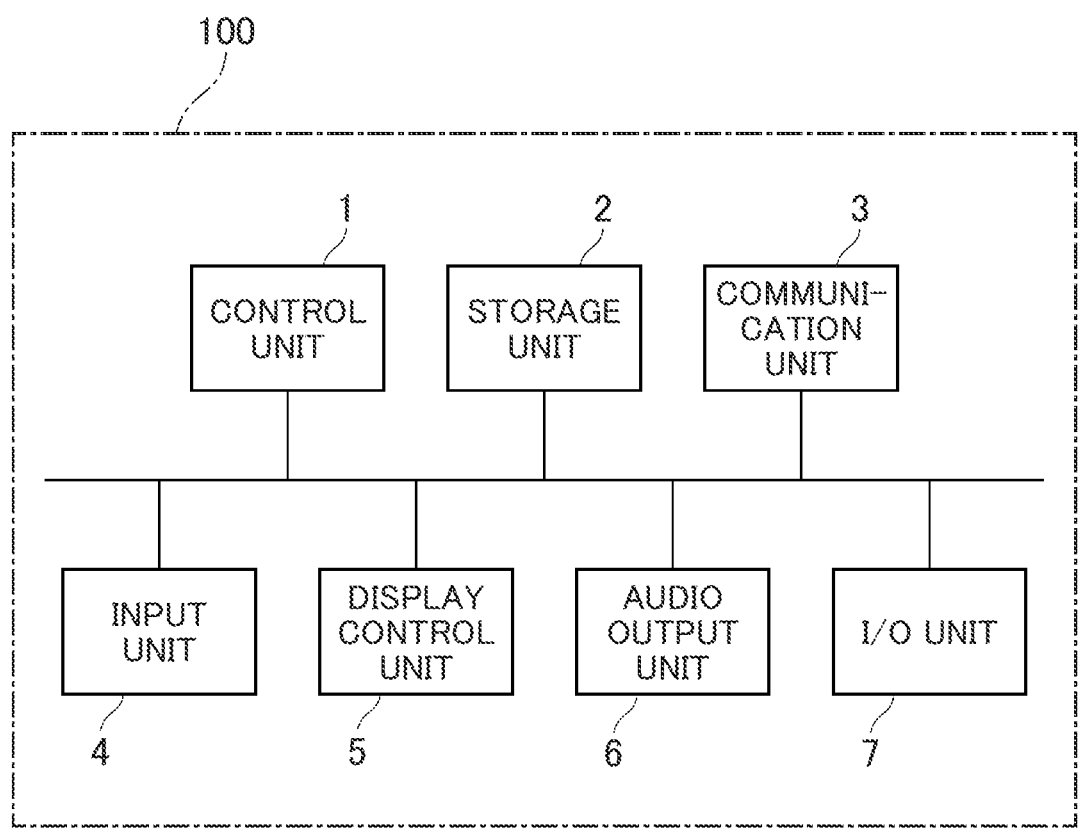
FIG. 1 is a hardware configuration diagram.

FIG. 1 is a hardware configuration diagram of an information processing apparatus 100 according to the present embodiment. As is clear from FIG. 1, the information processing apparatus 100 includes a control unit 1, a storage unit 2, a communication unit 3, an input unit 4, a display control unit 5, an audio output unit 6, and an I/O unit 7, which are connected via a bus.

The control unit 1, which is a control apparatus such as a CPU and a GPU, performs processing of executing a program that implements various kinds of operation which will be described later. For example, the control unit 1 performs overall control of the information processing apparatus 100, machine learning processing, prediction processing, and the like. The storage unit 2, which is a volatile or non-volatile storage apparatus such as a ROM and a RAM, stores data pieces to be learned that are training data pieces to be learned, a machine learning program, a prediction processing program, and the like. The communication unit 3 is a communication chip, or the like, that performs communication with external equipment through the Internet, a LAN, and the like. The input unit 4 processes a signal input through an input unit such as a keyboard, a touch panel and a button. The display control unit 5 is connected to a display, and the like, controls display and provides a GUI, and the like, to a user via the display, and the like. The audio output unit 6 is connected to a speaker, and the like, and outputs sound. The I/O unit 7 is an apparatus that performs processing of inputting/outputting information from/to an external apparatus.

Figure 2:
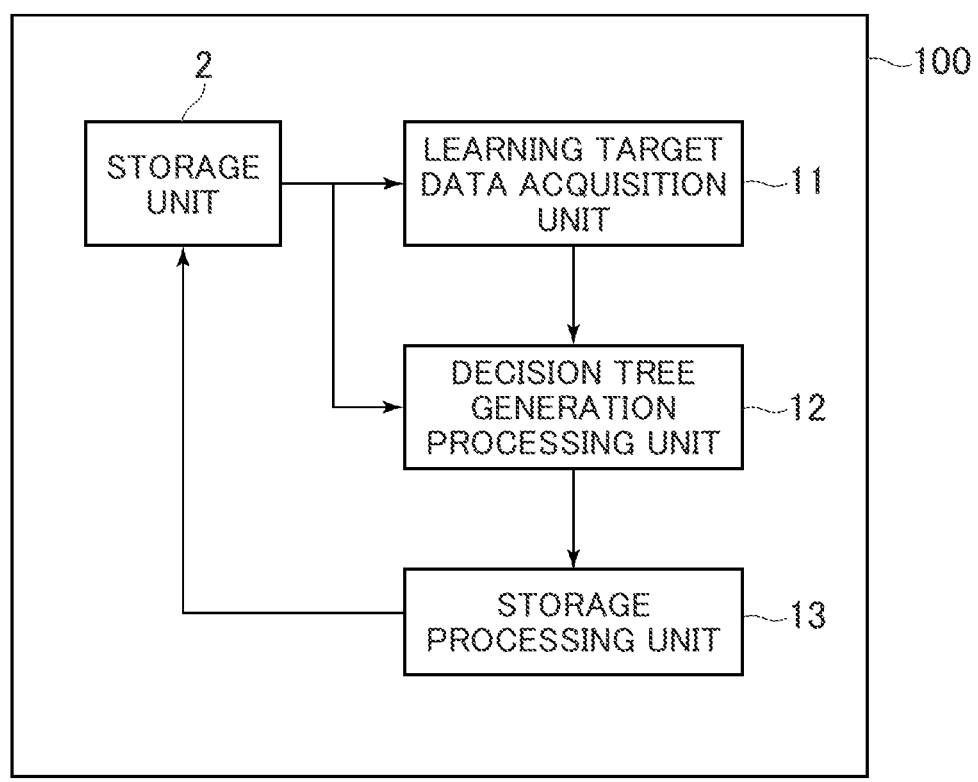
FIG. 2 is a functional block diagram of an information processing apparatus in a case where the information processing apparatus functions as a machine learning apparatus.

FIG. 2 is a functional block diagram of the information processing apparatus 100 in a case where the information processing apparatus 100 functions as a machine learning apparatus. As is clear from FIG. 2, in this case, the information processing apparatus 100 includes the storage unit 2, a learning target data acquisition unit 11, a decision tree generation processing unit 12, and a storage processing unit 13. The learning target data acquisition unit 11 performs processing of reading out and acquiring data pieces to be learned stored in the storage unit 2. The decision tree generation processing unit 12 performs processing of generating a decision tree on the basis of information such as parameters necessary for machine learning and the acquired data pieces to be learned. The storage processing unit 13 performs processing of storing the generated decision tree in the storage unit 2.

Figure 3:
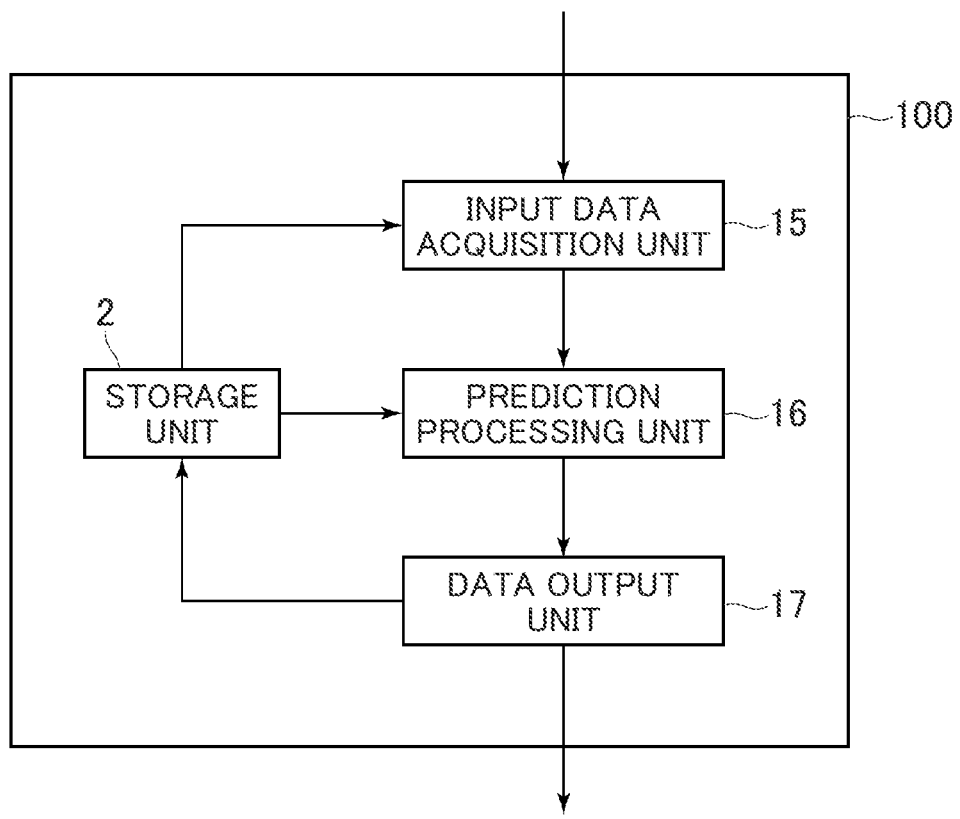
FIG. 3 is a functional block diagram of an information processing apparatus in a case where the information processing apparatus functions as a prediction apparatus.

FIG. 3 is a functional block diagram of the information processing apparatus 100 in a case where the information processing apparatus 100 functions as a prediction apparatus. As is clear from FIG. 3, in this case, the information processing apparatus 100 includes the storage unit 2, an input data acquisition unit 15, a prediction processing unit 16, and a data output unit 17. The input data acquisition unit 15 acquires input data input from outside or read out from the storage unit 2. The prediction processing unit 16 reads out the learned tree structure and information necessary for prediction from the storage unit 2 and generates a prediction result corresponding to the input data. The data output unit 17 performs processing of outputting data corresponding to the prediction result.

Note that the hardware configuration is not limited to the configuration according to the present embodiment. Thus, for example, part or all of components and functions may be distributed or integrated. Further, for example, processing may be performed in a distributed way by a plurality of information processing apparatuses 100 or a large-volume storage apparatus may be further externally provided and connected to the information processing apparatus 100. Still further, the present disclosure may be implemented by circuits using ICs, particularly, an ASIC, an FPGA, and the like.

Further, the information processing apparatus 100 of the present embodiment is not limited to an apparatus such as a personal computer and may be, for example, an apparatus that has various specific functions such as a machine tool or an apparatus having multiple functions.

(1.2 Operation)

Operation of the information processing apparatus 100 will be described next with reference to FIG. 4 to FIG. 8.

Figure 4:
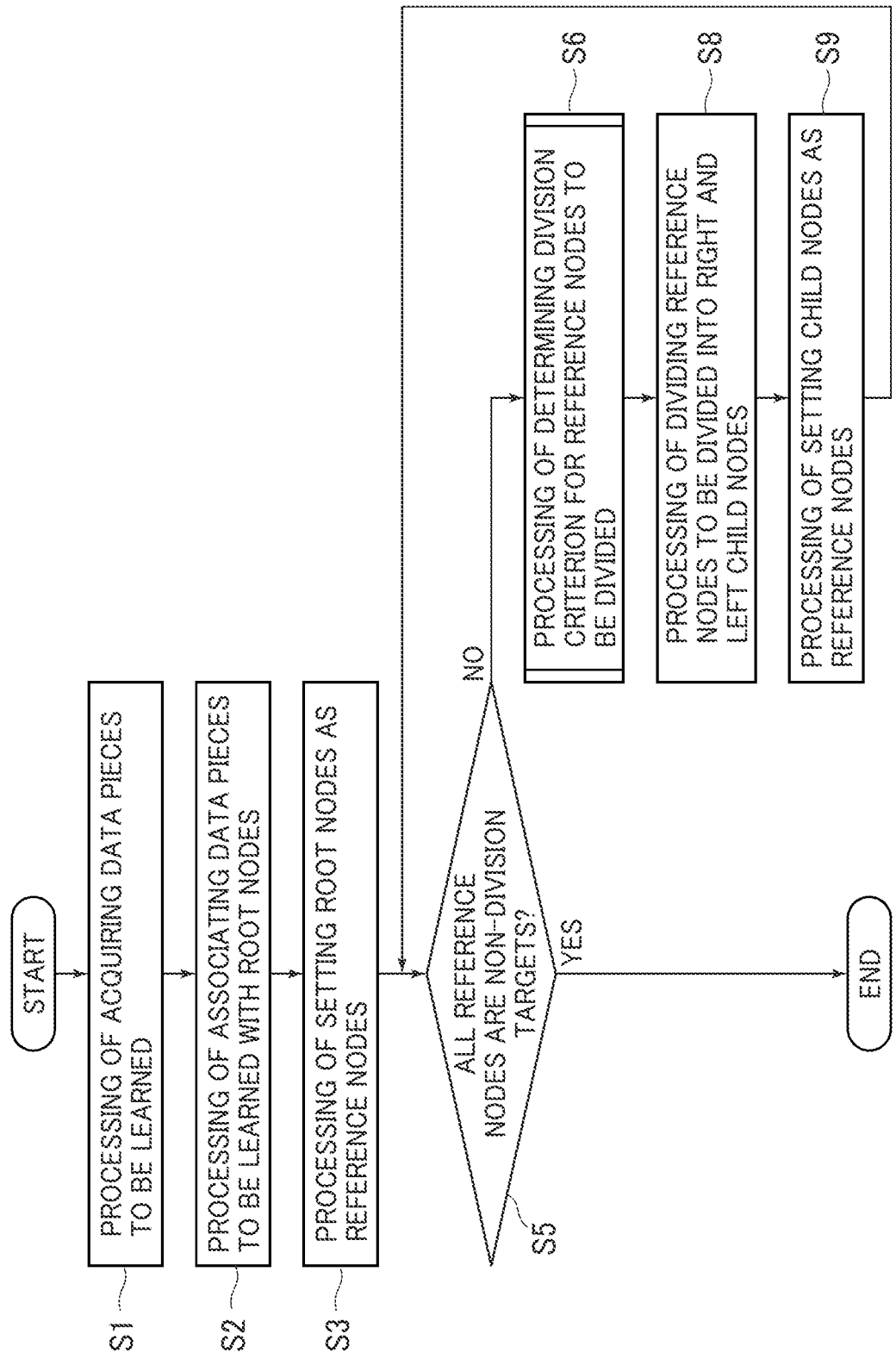
FIG. 4 is a general flowchart regarding generation processing of a tree structure.

FIG. 4 is a general flowchart regarding machine learning processing, that is, generation processing of a tree structure. As is clear from FIG. 4, when processing is started, the learning target data acquisition unit 11 performs processing of acquiring data pieces to be learned (S1). The decision tree generation processing unit 17 associates the acquired data pieces to be learned with nodes that are bases of a tree structure, that is, root nodes (S2).

Thereafter, the decision tree generation processing unit 17 performs processing of setting the root nodes as reference nodes (S3). Then, it is determined whether or not the reference nodes satisfy a division target condition (S5). Note that the division target condition is, for example, a condition as to whether or not a depth of the tree structure is a predetermined depth. In a case where the reference nodes include nodes to be divided (S5: No), a series of processing which will be described later is performed on the nodes to be divided (S6 to S9). In a case where the reference nodes include the nodes to be divided, first, processing of determining a division criterion for the reference nodes to be divided is performed (S6).

Figure 5:
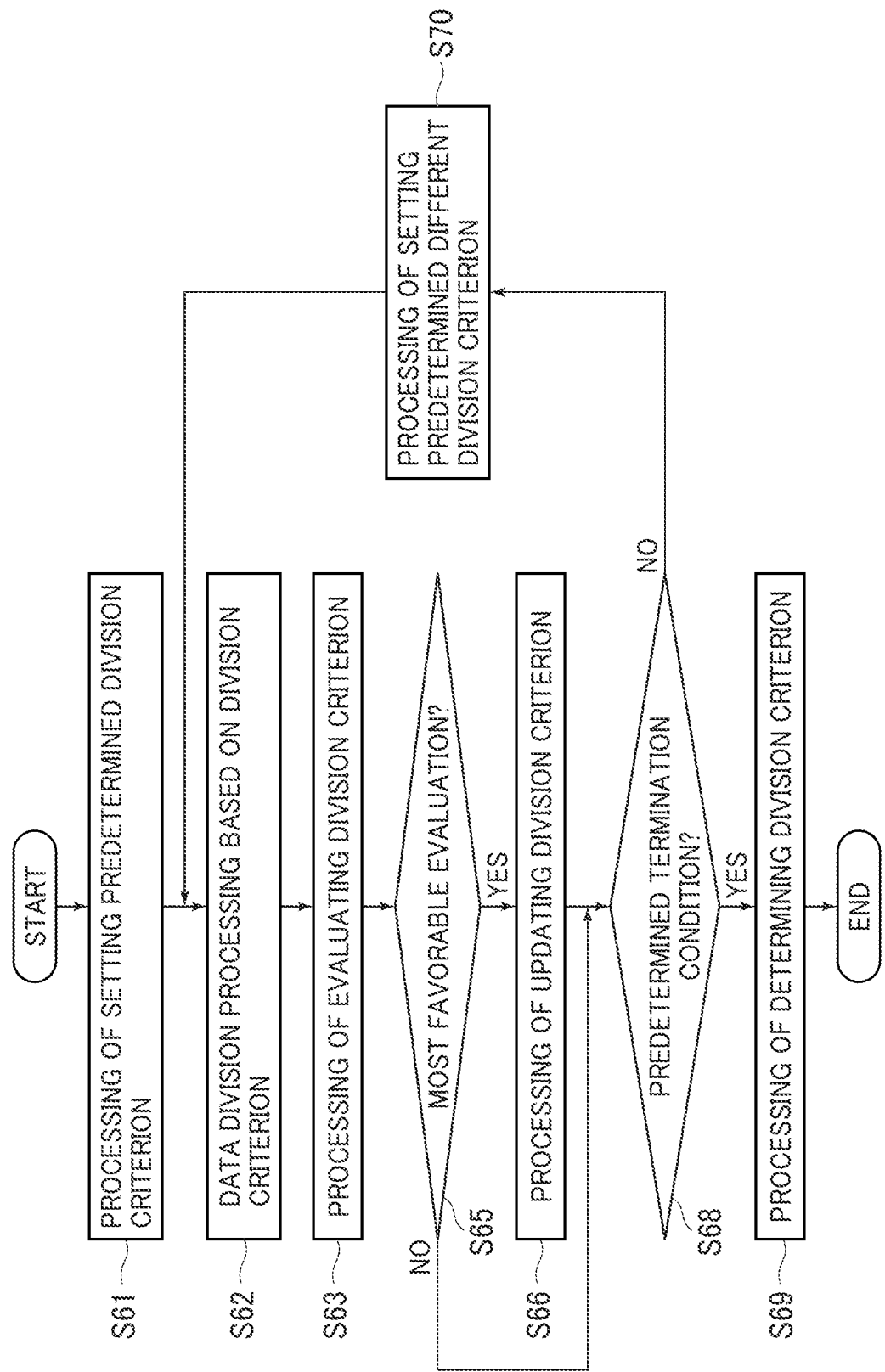
FIG. 5 is a detailed flowchart of division criterion determination processing.

FIG. 5 is a detailed flowchart of the division criterion determination processing (S6). As is clear from FIG. 5, when the processing is started, processing of setting a predetermined division criterion is performed (S61). In the present embodiment, an average value of a plurality of data pieces arbitrarily selected from data pieces to be divided is employed as a predetermined division criterion.

Figure 6:
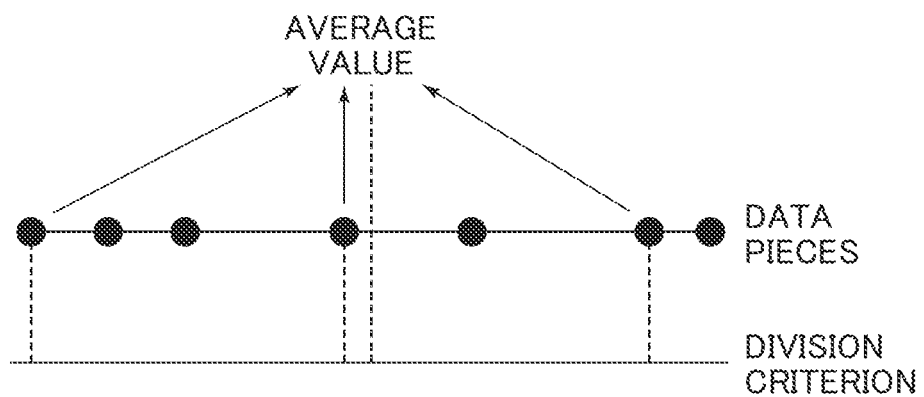
FIG. 6 is an explanatory diagram regarding a method for calculating a division criterion.

FIG. 6 is an explanatory diagram regarding a method for calculating the division criterion according to the present embodiment. As is clear from FIG. 6, in the present embodiment, an average value of data pieces at three points arbitrarily (randomly) selected from data pieces to be divided is used as the division criterion.

According to such a configuration, it is not necessary to refer to all the data pieces to be divided, which makes processing load in association with reference small. It is therefore possible to make learning speed higher. Further, an average value is calculated by selecting data pieces at a plurality of points from the data pieces to be divided, which makes dependency on the selected data pieces lower. Still further, the reference data pieces are arbitrarily selected, so that the reference data pieces are selected in accordance with distribution of the data pieces to be divided, that is, division can be performed while distribution of the data pieces to be divided is taken into account.

Then, processing of dividing data pieces to be learned on the basis of the set division criterion is performed (S62). When the division processing is completed, evaluation processing of the division criterion is performed (S63). This evaluation processing of the division criterion can be performed using various known manners. In the present embodiment, as an example, a division criterion that provides a greater information gain is evaluated as a more favorable division criterion.

After this evaluation processing, it is determined whether the evaluation result is more favorable than past evaluation results, that is, whether or not the evaluation result is the most favorable (S65). In a case where evaluation of the division criterion is the most favorable (S65: Yes), processing of updating the division criterion is performed, and processing of determining a predetermined termination condition is performed (S68). On the other hand, in a case where evaluation of the division criterion is not the most favorable, processing of determining the predetermined termination condition is performed without updating the evaluation result (S68).

In the present embodiment, the predetermined termination condition is whether or not the number of times of trial satisfies a predetermined number of times of trial. In other words, if the number of times of trial is 10, 10 division criteria are tried. In a case where the predetermined termination condition is satisfied, the latest division criterion determined as the most favorable is determined as the final division criterion (S69). On the other hand, in a case where it is determined that the predetermined termination condition is not yet satisfied (S68: No), processing of setting a different division criterion, that is, setting an average value of three data pieces arbitrarily selected again is performed (S70), and a series of processing is repeated again (S62 to S68).

Returning to FIG. 4, if the processing of determining the division criterion (S6) is completed, processing of dividing reference nodes into right and left child nodes is performed on the basis of the set division criterion (S8). After this division processing, processing of further setting the child nodes as the reference nodes is performed (S9), and processing of determining whether or not the reference nodes are division targets is performed again (S5). Such processing is performed until the reference nodes do not include nodes to be divided (S5: Yes), that is, until the reference nodes reach an end of the tree structure, and the processing is finished.

Figure 7:
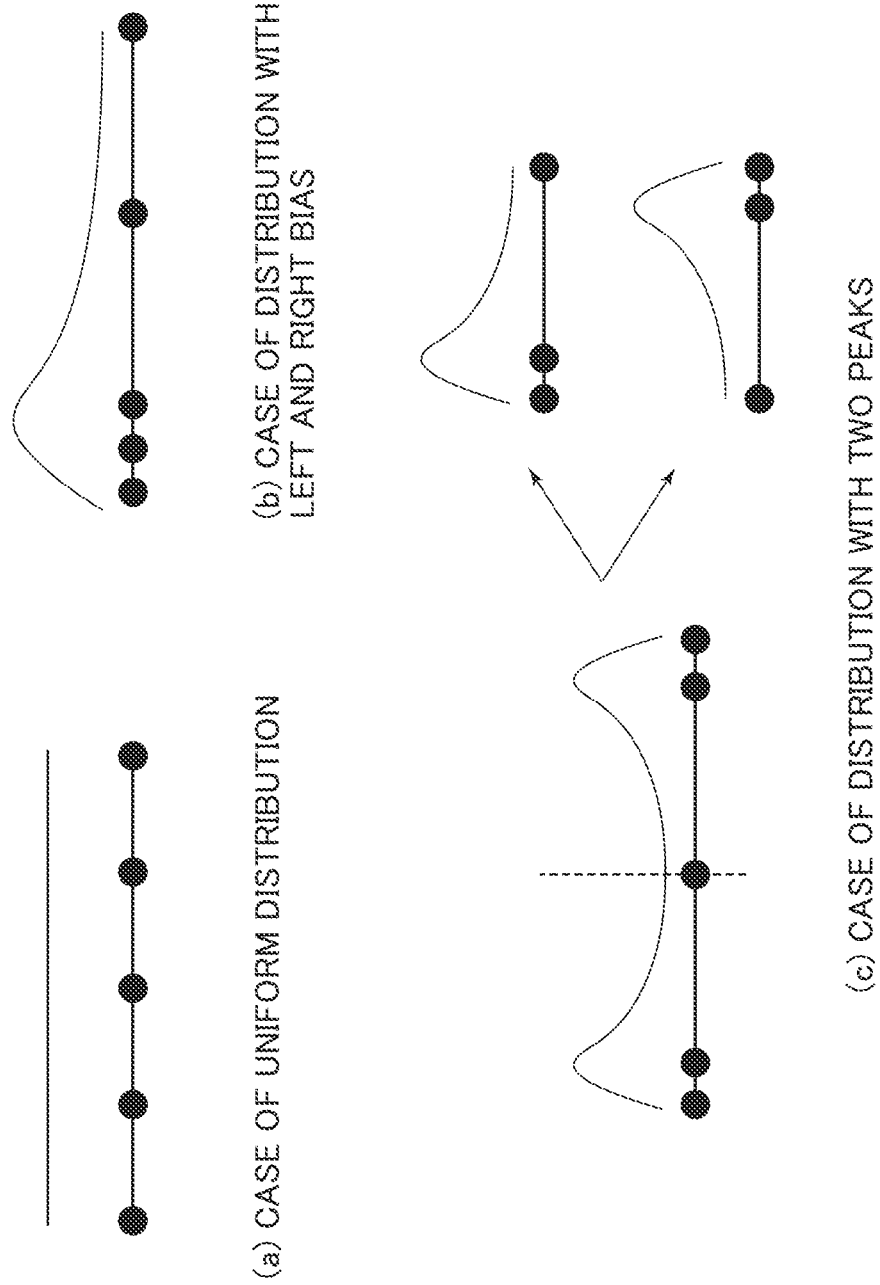
FIG. 7 is an explanatory diagram regarding division of various data pieces to be divided.

FIG. 7 is an explanatory diagram regarding division of various data pieces to be divided. In a case of uniform distribution as illustrated in FIG. 7(a), according to the manner according to the present embodiment in which an average value of data pieces at a plurality of arbitrary points is used, the data pieces are highly likely to be divided around the center. Further, as illustrated in FIG. 7(b), even in a case where there is bias in division targets, points located at a portion where density is particularly high in point distribution is likely to be selected, so that it is possible to divide the data pieces around a portion where point density is high even if an average value of data pieces at a plurality of points is used. Still further, in a case of distribution in which two peaks exist on a right side and a left side as illustrated in FIG. 7(c), while the data pieces are highly likely to be divided around the center where point density is low if an average value of data pieces at a plurality of points is used, in the subsequent step, the distribution becomes distribution having bias similar to the distribution in FIG. 7(b), so that it is eventually possible to appropriately divide the data pieces.

FIG. 8 is a comparison table between the division manner according to the present embodiment ((D) in FIG. 8) and other division manners ((A) to (C)). The division manner (A) is a manner in which one data piece is randomly selected from the data pieces to be divided and determined as a division criterion, the division manner (B) is a manner in which normalization is performed while a minimum value and a maximum value are detected with reference to the whole of the data pieces to be divided, and an arbitrary value between the minimum value and the maximum value is determined as the division criterion, and the division target manner (C) is a manner in which the division criterion is determined by generating a histogram on the basis of the data pieces to be divided.

As is clear from FIG. 8, in terms of speed of division point criterion determination, that is, smallness of calculation load, the division manner (A) and the division manner (D) in which it is not necessary to refer to all the data pieces to be divided in advance are advantageous. Further, data distribution is taken into account in all the manners except the division manner (B) in which normalization is performed. Further, there is a possibility that data pieces other than the data pieces to be divided may be selected in the manners except the division manners (A) and (C) in which data pieces are selected from the data pieces to be divided. Such a possibility that data pieces other than data pieces to be learned may be selected increases flexibility and diversification of values to be set as division criterion candidates, which results in increasing diversification of the decision tree. This is particularly prominent in a case where the number of data pieces is small. As a result of this, for example, the manner is suitable for an algorithm utilizing a plurality of decision trees such as a random forest.

In other words, according to the manner according to the present embodiment, the division criterion can be rapidly determined while distribution of data pieces to be divided is taken into account. Further, values other than the data points can be taken into account as the division criteria, so that it is possible to achieve generation of flexible and diversified division criteria.

According to such a configuration, the data pieces are divided by generating division criterion candidates from a plurality of data pieces arbitrarily selected from the data pieces to be divided, so that it is not necessary to refer to values for all the data pieces to be divided, which makes calculation load small, and it is possible to divide the data pieces at an appropriate position because of low dependency on the selected data pieces. In other words, it is possible to rapidly and appropriately determine the division criterion for appropriately dividing data pieces to be learned in generation of a tree structure to be utilized in machine learning.

Further, the average value of a plurality of data pieces arbitrarily selected from the data pieces to be divided is used as the division criterion candidate, so that it is possible to determine an appropriate division criterion while lowering dependency on the selected data pieces.

(2. Modification)

While in the above-described embodiment, a fixed division manner is used regardless of the number of data pieces to be learned, the present disclosure is not limited to such a configuration. Thus, for example, the division manner may be switched in accordance with the number of data pieces to be learned.

Figure 9:
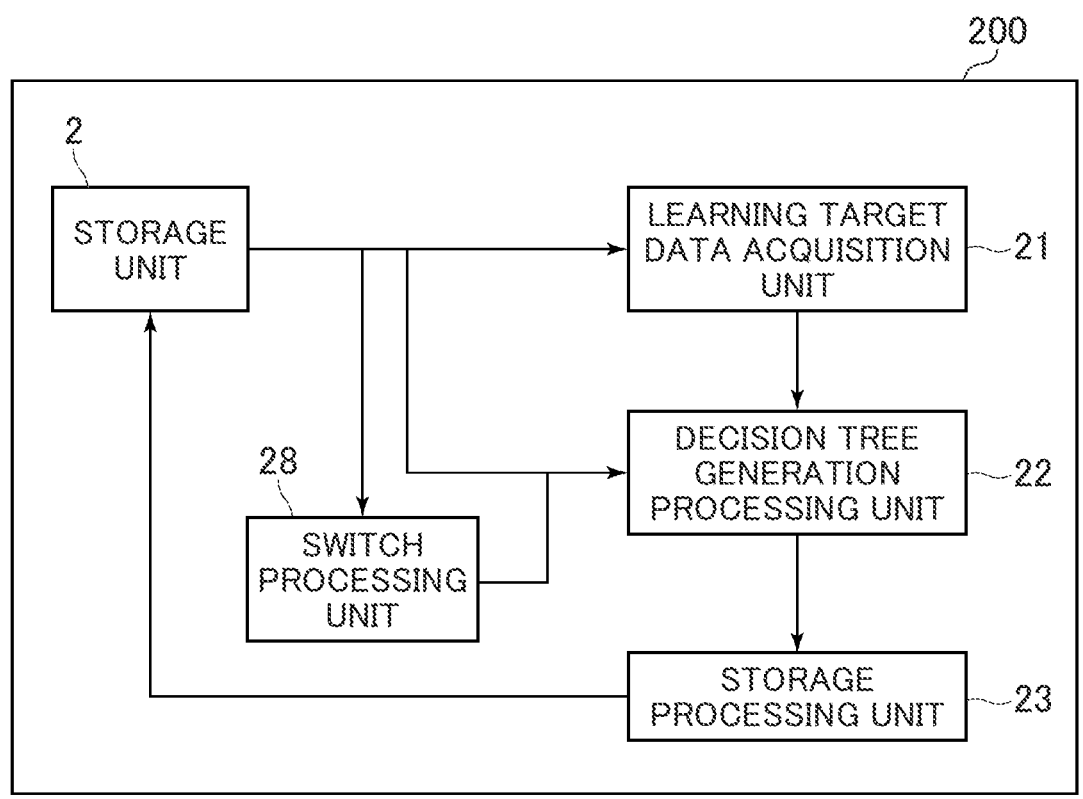
FIG. 9 is a functional block diagram of an information processing apparatus according to a modification.
Figure 10:
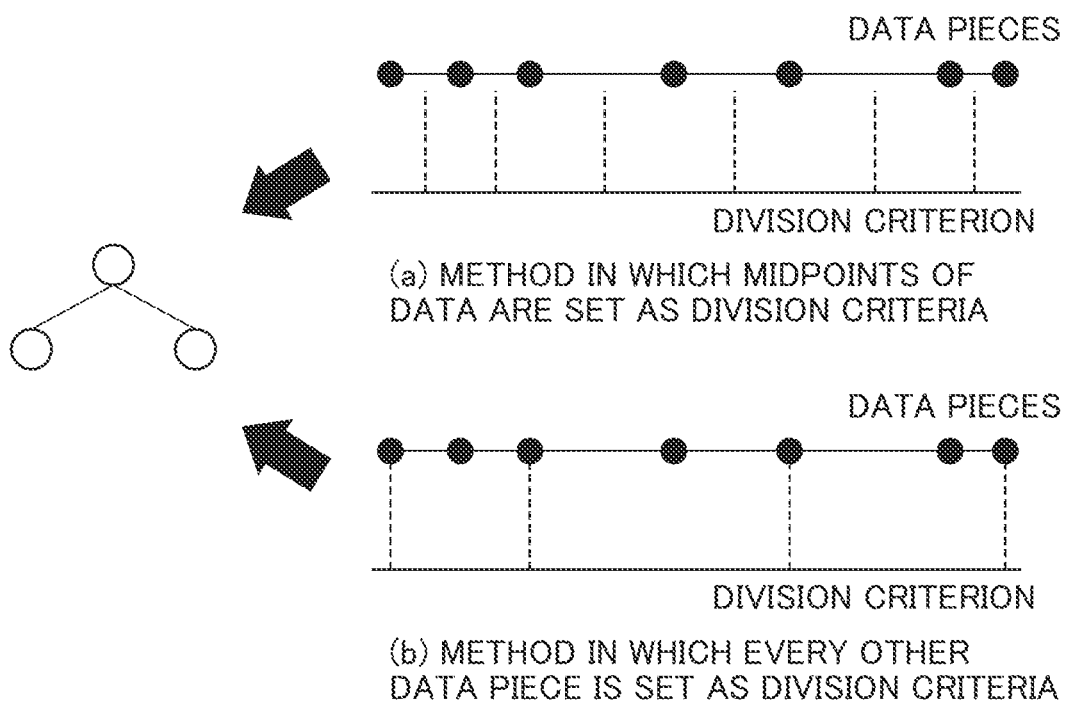
FIG. 10 is an explanatory diagram regarding a method for determining a division criterion for data pieces to be learned in a decision tree in related art.

FIG. 9 is a functional block diagram of an information processing apparatus 200 according to a modification. The information processing apparatus 200 further includes a switch processing unit 28 in addition to the storage unit 2, a learning target data acquisition unit 21, a decision tree generation processing unit 22 and a storage output unit 23 having substantially the same functions as those in the first embodiment. In the present modification, the switch processing unit 28 switches the division manner to be used in generation of a tree structure in accordance with the number of data pieces to be divided read out from the storage unit 2.

In a case where the number of data pieces to be divided is equal to or smaller than a predetermined number, data distribution is highly likely to be unreliable, and thus, a division manner that is less affected by data distribution is suitable. Thus, the switch processing unit 28 makes settings to generate a tree structure using the above-described division manner (B) in which normalization is performed and which is less affected by data distribution. On the other hand, in a case where the number of data pieces to be divided is equal to or larger than the predetermined number, data distribution is highly likely to be reliable, and thus, a division manner which is affected by data distribution is suitable. Thus, the switch processing unit 28 makes settings to generate a tree structure using the above-described division manner (D), or the like, in which data distribution can be taken into account.

While in the above-described embodiment, an average value of a plurality of data pieces arbitrarily selected from the data pieces to be divided is calculated in generation of the division criterion candidates, the present disclosure is not limited to such a configuration. Thus, other division processing may be applied to a plurality of data pieces arbitrarily selected from the data pieces to be divided in generation of the division criterion candidates.

For example, the division manner (B) (the method for determining the division criterion in which normalization is performed) or the division manner (D) (the method for determining the division criterion by utilizing the histogram) described in the above-described embodiment may be applied to a plurality of data pieces that are arbitrarily selected. According to such a manner, processing is performed on the selected limited number of data pieces, so that it is possible to apply a division manner in which data distribution can be taken into account although calculation load is relatively high. In other words, it is possible to achieve both higher speed of the division criterion determination and appropriate division.

While in the above-described embodiment, processing of generating a single tree structure (decision tree) and utilization thereof have been described, the present disclosure is not limited to such a configuration. Thus, the processing of generating a tree structure can also be applied to ensemble learning utilizing a plurality of tree structures. This ensemble learning includes, for example, bagging, boosting, and the like, utilizing tree structures.

Here, the bagging utilizing tree structures is a manner in which tree structures are arranged in parallel, and an average of prediction values of all the tree structures is calculated, or majority voting is performed (for example, a random forest). Further, the boosting utilizing tree structures is a manner in which tree structures are arranged in series, and a residual error that cannot be sufficiently expressed in an immediately preceding tree structure is learned. Note that in a case where ensemble learning is performed, these manners may be combined. For example, the random forest that is one type of bagging may be hierarchically arranged, and residual learning may be performed using boosting.

INDUSTRIAL APPLICABILITY

The present disclosure can be utilized in various industries that utilize machine learning techniques utilizing tree structures.

REFERENCE SIGNS LIST 1 control unit
2 storage unit
3 communication unit
4 input unit
5 display control unit
6 audio output unit
7 I/O unit
11 learning target data acquisition unit
12 decision tree generation processing unit
13 storage processing unit
15 input data acquisition unit
16 prediction processing unit
17 data output unit
21 learning target data acquisition unit
22 decision tree generation processing unit
23 storage output unit
28 switch processing unit
100 information processing apparatus
200 information processing apparatus (modification)

The invention claimed is:

1. A machine learning processing apparatus, with a processor and a memory, configured to generate a tree structure to be utilized in machine learning on a basis of data pieces in the memory, the machine learning processing apparatus comprising:
candidate generator processor circuitry configured to generate a plurality of data division criterion candidates for a reference node that constitutes the tree structure by generating data division criterion candidates on a basis of a predetermined number of a plurality of data pieces referenced by the processor and arbitrarily selected from the data pieces for the reference node;
data division processor circuitry configured to divide the data pieces for the reference node on a basis of the plurality of data division criterion candidates to generate a plurality of data division results;
evaluation processor circuitry configured to evaluate the data division results to respectively generate evaluation results; and
division criterion determination processor circuitry configured to determine one data division criterion candidate among the plurality of data division criterion candidates as a data division criterion on a basis of the evaluation results, and
wherein the data division criterion candidates are average values of the predetermined number of the plurality of data pieces referenced by the processor and arbitrarily selected from the data pieces for the reference node, or arbitrary values between a minimum value and a maximum value of the predetermined number of the plurality of data pieces referenced by the processor and arbitrarily selected from the data pieces for the reference node, whereby the processor's processing load associated with referencing the data pieces for the reference node is reduced while the low dependency on the data pieces for the reference node is achieved.

2. The information processing apparatus according to claim 1, further comprising:
a switch configured to generate a switch signal for switching a generation algorithm of the data division criterion candidates in a case where the number of the data pieces to be divided is equal to or larger than a predetermined number.

3. The information processing apparatus according to claim 1,
wherein a manner of the machine learning is a decision tree.

4. The information processing apparatus according to claim 1,
wherein a manner of the machine learning is ensemble learning utilizing a plurality of tree structures.

5. The information processing apparatus according to claim 4,
wherein a manner of the ensemble learning is one or a combination of bagging and boosting utilizing tree structures.

6. The information processing apparatus according to claim 4,
wherein a manner of the ensemble learning is a random forest.

7. The information processing apparatus according to claim 1, wherein the predetermined number is three.

8. A machine learning processing method performed on a computer with a processor and a memory for generating a tree structure to be utilized in machine learning on a basis of data pieces in the memory, the machine learning processing method comprising:
generating a plurality of data division criterion candidates for a reference node that constitutes the tree structure by generating data division criterion candidates on a basis of a predetermined number of a plurality of data pieces referenced by the processor and arbitrarily selected from the data pieces for the reference node;
dividing the data pieces for the reference node on a basis of the plurality of data division criterion candidates to generate a plurality of data division results;
evaluating the data division results to respectively generate evaluation results; and
determining one data division criterion candidate among the plurality of data division criterion candidates as a data division criterion on a basis of the evaluation results, and
wherein the data division criterion candidates are average values of the predetermined number of the plurality of data pieces referenced by the processor and arbitrarily selected from the data pieces for the reference node, or arbitrary values between a minimum value and a maximum value of the predetermined number of the plurality of data pieces referenced by the processor and arbitrarily selected from the data pieces for the reference node, whereby the processor's processing load associated with referencing the data pieces for the reference node is reduced while the low dependency on the data pieces for the reference node is achieved.

9. A non-transitory computer-readable medium having one or more executable instructions stored thereon causing a computer with a processor and a memory to function as machine learning processing apparatus, which, when executed by processor, cause the processor to perform a machine learning processing method for generating a tree structure to be utilized in machine learning on a basis of data pieces in the memory, the method comprising:
generating a plurality of data division criterion candidates for a reference node that constitutes the tree structure by generating data division criterion candidates on a basis of a predetermined number of a plurality of data pieces referenced by the processor and arbitrarily selected from the data pieces for the reference node;
dividing the data pieces for the reference node on a basis of the plurality of data division criterion candidates to generate a plurality of data division results;
evaluating the data division results to respectively generate evaluation results; and
determining one data division criterion candidate among the plurality of data division criterion candidates as a data division criterion on a basis of the evaluation results, and
wherein the data division criterion candidates are average values of the predetermined number of the plurality of data pieces referenced by the processor and arbitrarily selected from the data pieces for the reference node, or arbitrary values between a minimum value and a maximum value of the predetermined number of the plurality of data pieces referenced by the processor and arbitrarily selected from the data pieces for the reference node, whereby the processor's processing load associated with referencing the data pieces for the reference node is reduced while the low dependency on the data pieces for the reference node is achieved.

* * * * *